//www.wikidata.org/wiki/Q123
United States Patent [19]
Guibeaud

[11] 3,952,487
[45] Apr. 27, 1976

[54] MACHINE FOR AUTOMATICALLY GATHERING FRUITS AND IN PARTICULAR ENABLING VINTAGING

[76] Inventor: Georges Guibeaud, 58, rue Marechal Foch, 66000 Perpignan, France

[22] Filed: July 22, 1974

[21] Appl. No.: 490,859

[30] Foreign Application Priority Data
July 23, 1973 France .............................. 73.26974

[52] U.S. Cl. .............................. 56/328 R; 56/12.8; 56/330; 302/30
[51] Int. Cl.² ............................................. A01D 46/00
[58] Field of Search ................ 56/330, 328 R, 12.8, 56/30–32; 302/30, 43, 46, 50

[56] References Cited
UNITED STATES PATENTS
979,184   12/1910   Matthiessen .......................... 302/30
2,544,443  3/1951   Brateng ................................. 56/330
3,165,879  1/1965   Chapin .................................. 56/330
3,693,331  9/1972   Richter et al. ................. 56/328 R X Primary Examiner—Louis G. Mancene
Assistant Examiner—J. N. Eskovitz
Attorney, Agent, or Firm—Jay L. Chaskin

[57] ABSTRACT

A machine for automatically picking fruits on shrubs and notably ripe grapes from vine-stocks with a view to provide a clean and stripped vintage for making wine. The machine comprises a series of juxtaposed bells formed in a passage-way duct adapted to move along a row of shrubs. Means for blowing a rising gyratory main air flow in each bell are provided ensuring the picking of the fruits and their carrying along through a lifting centrifugation up to the top of the bells where they are received in a collecting tank.

13 Claims, 5 Drawing Figures

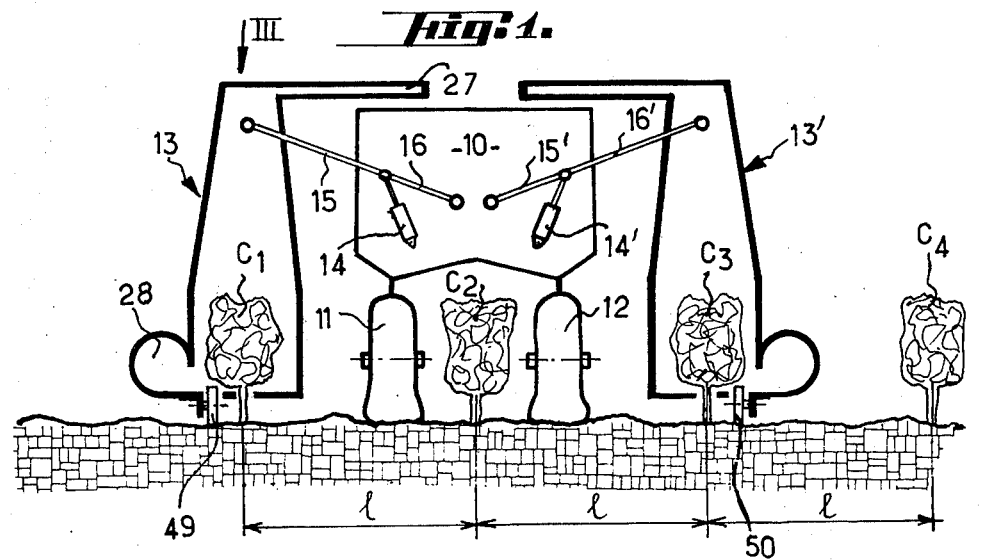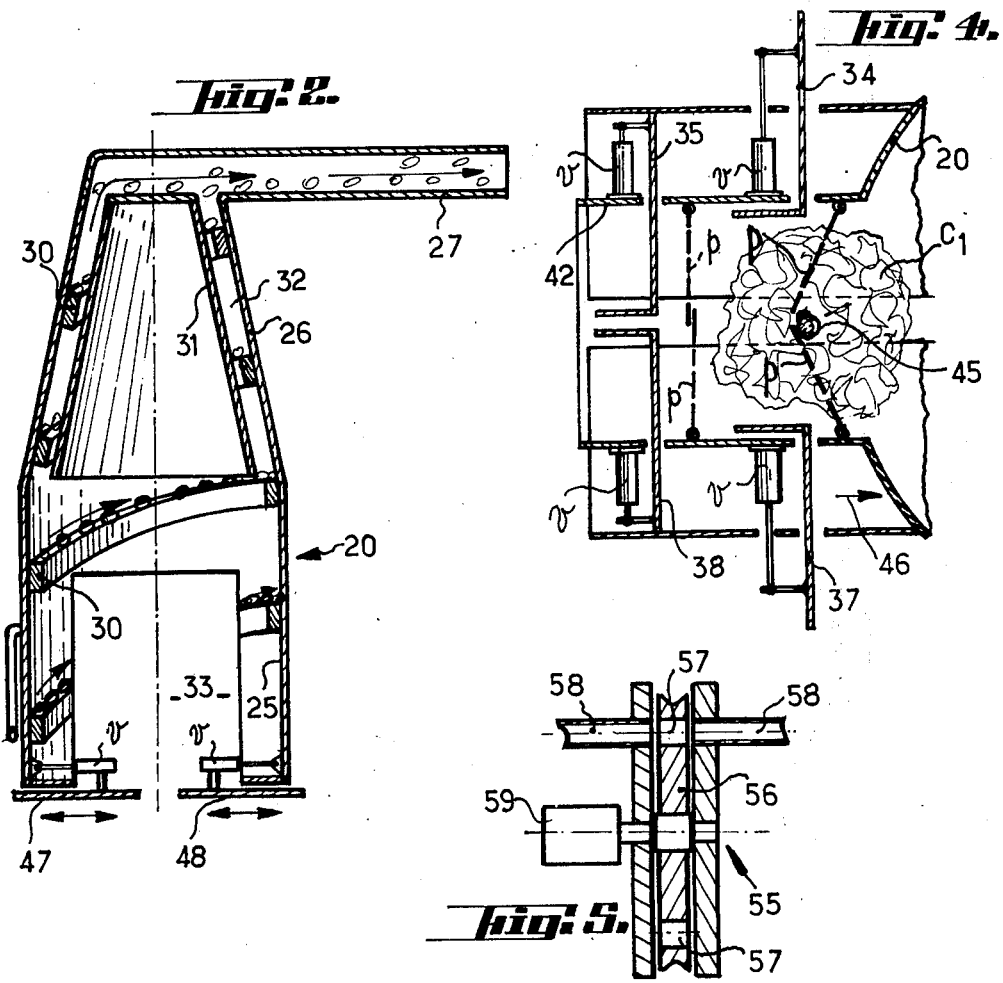

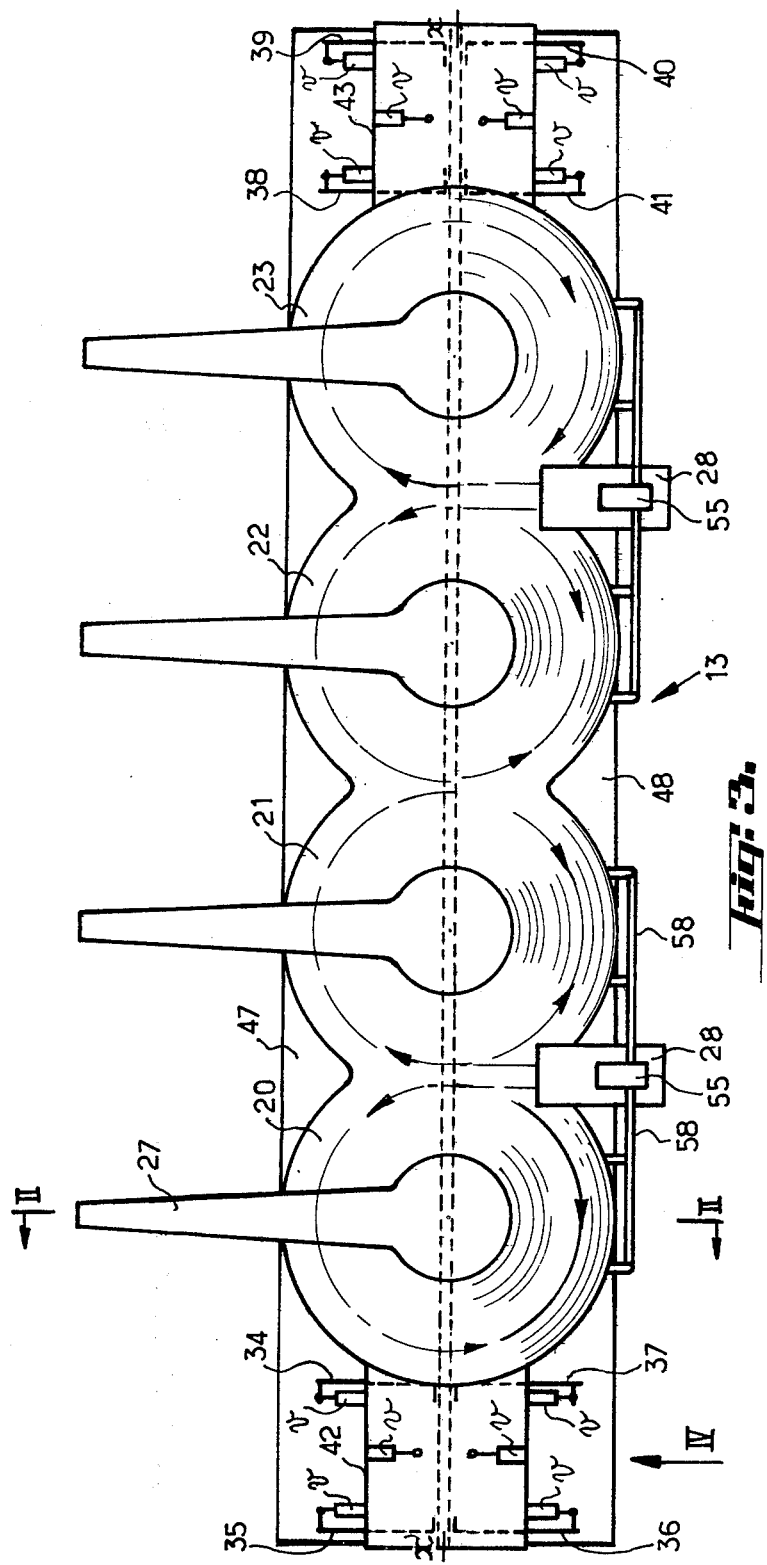

MACHINE FOR AUTOMATICALLY GATHERING FRUITS AND IN PARTICULAR ENABLING VINTAGING

The present invention relates essentially to a machine enabling to automatically carry out the gathering, picking or cropping of fruits on or from shrubs or bushes and fruit trees. According to the invention the goal aimed at is more particuarly to only gather or pick the fruits or berries without affecting the remaining vegetation and in particular the leaves and grapestalks when dealing more particularly with the gathering or picking of ripe grapes on or from vine-stocks with a view to provide a clean and stripped vintage for making wine.

There are already known machines enabling to carry out an automatic fruit cropping, picking or gathering, in which machines the process consists in surrounding the stock, stem, head or foot from which fruits are to be picked off by a series of nozzles which are adapted to spout or eject a series of strong or powerful jets, gushes or streams of compressed air. The jets may be directionally controlled or sweep over the whole surface of the tree and they may possible be discontinued or cut off sequentially so as to save compressed air and to achieve a more effective fruit gathering or cropping through the action of repeated shocks.

Such machines may be suitable in some cases for instance for gathering olives or nuts when the fruits are breaking off, separating or severing themselves rather easily when they are ripe and when it is not difficult afterwards to sort them out for removing the leaves and sprigs or twigs which have been torn or pulled off at the same time as the fruits from the tree.

Such machines are however fully ineffective in many other cases and in particular for effecting vintaging or vine-gathering if it is desirable to leave the leaves and stalks on the vinestocks and pick the ripe berries only. Moreover in the known machines the gathered fruits would fall on the ground unless some vat, bin or container is placed therebelow which is not very convenient on account of the small height usually available underneath a vine-stock in particular when it is not nailed up, trained or tied.

The machine forming the subject matter of the invention enables to overcome all the aforementioned difficulties by automatically effecting the gathering of ripe berries only while leaving on the feet, heads or stems the remainder of the vegetation and in particular the leaves and stalks in the case of vine and automatically delivering or discharging the picked crop into a receiving vehicle. The machine forming the subject matter of the invention for effecting the automatic gathering or picking of fruits and in particular of berries such as vine grapes growing on stocks, shrubs or bushes and using means for enclosing the shrubs or bushes within an enclosed space which is subjected to the action of a violent air stream likely to break off, separate or sever the fruits, is characterized in that said enclosed space comprises at least one bell-like casing or shell which is adapted to surround in substantially fluid-tight or sealing relationship the major part of the shrub, means for blowing a main air flow being provided for producing within the inner space of said bell-like casing an upward directed or raising gyratory or circular or swirling air displacement and means being provided for receiving within the top portion of the bell-like casings the severed or broken off fruits which have been carried along through upward directed centrifugation up to the top of the bell-like casing. The bell-like casing advantageously comprises inside thereof at least one helical ramp extending upwards in the direction of rotation of the air displacement which is moving therethrough. Moreover with a view to increase the efficiency or yield of the machine there are provided means for blowing a modulated secondary air flow or stream into said bell-like casing.

When operating in this manner the fruits and for instance the vine grapes placed within a raising gyratory upwards directed air stream and broken off the stalk are thrown through centrifugation against the inner wall of the bell-like casing in which they are rising along the upward extending helical ramp until issuing forth at the upper portion of the bell-like casing for instance into a duct, chute or like passageway discharging the berries into a receiving bucket. The modulation of the secondary air flow rate induces within the bell-like casing a vibration the frequency of which may be adjusted at will and which produces owing to the gyratory whirling motion of the main air stream of flow blown into the bell-like casing an alternating torsional or twisting motion imparted to every vine grape the frequency of which is set by the secondary air flow modulation frequency. It is understandable that by selecting this modulation frequency to be close to the resonance frequency of rotation of a vine grape of mean or average size, there is thereby achieved a very effective automatic separation of each vine grape which is picked on its stalk through alternate flexures or bendings of the stalk. The raising gyratory main air motion is not under such circumstances required to be very large for carrying along through centrifugation alongside the upward extending helical ramp the various vine grapes which are rolling along this ramp while being urged or pushed by centrifugation against the inner wall of the bell-like casing and which issue out at the top portion of the bell-like casing into a suitable collecting channel, duct or like passageway. Under these conditions it is obvious that the leaves and the stalks remain or are left on the vine stock as they are not torn off or broken away by the not very strong main air stream and are not very sensitive to the vibrations induced within the air volume of the bell-like casing and which at the very most cause them only to vibrate about themselves slightly.

The machine forming the subject matter of the invention may of course be applied to other fruits than vine grapes and for instance to the picking of cherries, olives, etc.

The invention will be better understood and further objects, characterizing features, details and advantages thereof will appear more clearly as the following explanatory description proceeds with reference to the accompanying diagrammatic drawings given by way of non-limiting example only illustrating a presently preferred specific form of embodiment of the invention. In these drawings:

FIG. 1 is a diagrammatic view in section taken upon a vertical plane and showing a machine according to the invention in operation on rows or arrays of shrubs such as vine stocks;

FIG. 2 is a vertical section on a larger scale showing a bell-like casing used in a machine according to the invention, this section being taken substantially upon the plane II—II in FIG. 3;

FIG. 3 is a top view drawn on a larger scale and seen substantially in the direction of the arrow III in FIG. 1 showing a series of four gathering bell-like casings arranged on one side of the machine and effecting the continuous picking from a row of shrubs:

FIG. 4 shows in horizontal section drawn on a larger scale taken at a shrub, one end portion of the gathering duct illustrated in FIG. 3 in the area designated by the reference character IV in this Figure; and FIG. 5 is a view in section with parts broken away, showing a detail of the construction of an air pressure modulator which may be used according to the invention for imparting the required vibrating motion to the mass or body of air circulating within the bell-like casings.

According to the form of embodiment illustrated in the drawings more specifically with reference to a machine enabling to vintage vine stocks grown in goblet-trained fashion and aligned in rows, the machine essentially comprises a tractor vehicle diagrammatically shown at 10 (FIG. 1) the wheels 11, 12 of which running on either side of a row of vine stocks $C_2$ enable the machine to straddle this row of stocks while continuously picking from the adjacent rows $C_1$, $C_3$. When the picking from these rows is completed it is then possible for instance to pick from the rows $C_1$ and $C_4$ by causing the vehicle to run over or above the row $C_3$.

The vehicle comprises on either side two collecting ducts 13, 13' the construction of which will be described hereinafter. These ducts may be adjusted in height or vertically and in their spacings from the vehicle 10 for instance by means of ram-like power actuators 14, 14' and pivoted rods or links 15, 16, 15', 16'. The machine may be built so as to be perfectly symmetrical and therefore only the gathering duct 13 will be described hereinafter.

As appears more clearly from FIGS. 2 to 4 the picking duct 13 comprises a plurality of bells, their number being four 20, 21, 22, 23 in the example under consideration, which are juxtaposed in series and aligned along the longitudinal center line $x'x$ of the duct 13 which is co-extensive with the direction of each row of stocks such as $C_1$.

As appears from FIG. 2 each bell such as 20 exhibits at its bottom or base a substantially circular inner section 25 likely to take in a vine stock and which is topped at its upper portion by a stack or chimney 26 which opens at its top portion into a duct 27 for picking the berries which may be discharged directly into a bucket carried by the tractor vehicle 10.

Between each pair of bells 20, 21 and 22, 23 is provided towards the base a turbine or like impeller 28 which sucks or draws in the outer air and blows same as shown by the arrows in FIG. 3 into the juxtaposed bells as two whirling air motions rotating in opposite directions from one bell of the pair to the next one. Thus is produced in each bell a rising whirling air motion which successively flows through the bottom portion 25 of each bell and then through the stack 26 to be finally blown through the duct 27. In order to facilitate the whirling displacement movement of the air inside the bell and the driving of the picked vine grapes there is desirably provided at the inner wall of the bell and the stack an upward extending helical ramp or like guide-way 30 which extends upwards in the direction of rotation of the whirling air. Moreover within the space of the chimney stack 26 there may be provisions for reducing the air-flow passageway to a relatively narrow gap between the inner wall of the chimney stack 26 and a corresponding frusto-conical or tapering formation 31 promoting the raising of the picked berries within the chimney stack thus reduced to an annular passageway 32. At their lower portions the walls 25 of the bells comprise two openings 33 arranged in diametrally opposed relationship in the longitudinal direction $x'x$ for the communication of the various bells of the assembly 13 with each other and for allowing the free travel of the machine along the row of vine stocks.

At each one of its ends the assembly 13 forming a picking duct comprises double separating doors shown at 34 to 41 and forming lock-chambers. These doors (see FIG. 4) enable to tightly close in sealing relationship an inlet passage-way 42 (together with the symmetrical one 43 provided at the other end of the duct 13) which terminates at the opening 33 of the end bells 20, 23.

The various doors may slide transversely by being operated for instance through ram-like power actuators $v$ the operation of which for opening the door may be triggered for instance by feelers, sensors or like detectors $p$ when they meet on their path of travel and obstacle such as a stump 45 of vine stock (FIG. 4). When after having moved past the stump the feelers or sensors $p$ are no longer detecting any obstacle, the doors such as 34, 37 (FIG. 4) may close for instance resiliently after having passed the vine stock. A moment later when the machine has advanced the doors 35, 38 of the lock-chamber which were closed will be operated to become open for allowing the stock to pass therethrough (it being understood that the machine moves in the direction of the arrow 46) while the doors 34, 37 have already closed.

For closing the bases or bottom portions of the bells there is likewise provided a floor the central portion of which is adapted to be moved apart or aside for allowing the feet of the stumps to pass from the center line of the duct.

As shown in FIG. 2 the floor may comprise two parts such as 47, 48 which may slide as shown by the double arrows so as to move away from or towards each other for instance under the driving action of ram-like power actuators $v$ controlled by feelers or like sensors at the time when stumps are passing.

Alternatively the floor may consist of a material resilient enough to move aside when the stumps are passing by and to overlap while providing a relatively good tightness or seal between any two adjacent stumps.

The floor may be supported by the bells or may also ride on the ground while possibly supporting the duct 13 partially. Moreover this duct is preferably supported at least at each one of its ends by wheels or rollers such as 49, 50 (FIG. 1).

Now with reference more particularly to FIGS. 3 and 5 there is shown a modulator 55 mounted on the casing of each turbine or impeller 28 and enabling to blow pulsating compressed air into each bell.

The modulator 55 essentially comprises a disk 56 formed with perforations 57 which are rotating within a gap into which open both ends of a duct 58 fed with compressed air. The rotation of the disk 56 may be controlled for instance by means of a small appendant electric drive motor 59. Under these conditions the stream of compressed air supplied into the duct 58 is sequentially discontinued and sequentially restored every time a hole 57 comes in front of the duct 58. It is thus possible to modulate, with a frequency to be set by the rotational speed of the disk 56 and by the number of holes 57, compressed air jets directed through the ducts 58 into the bells of the passage-way. The duct 58 may feed a plurality of injection nozzles of each bell opening at different levels and at different angles. As shown in FIG. 3 there is provided for each bell two modulated air injections at different heights but many other arrangements are of course possible.

The compressed air supply delivered to the modulator 55 will be conveniently provided by a compressor or air booster carried by the tractor vehicle whereas the driving of the turbines may be provided by an electric motor operatively connected to the turbine shaft and electrically energized from the tractor vehicle. The various actuating controls in particular for operating the doors and floors may be carried out as pneumatic actuators from a source of compressed air supply mounted on board the tractor vehicle.

With reference to the previous description the operation of the machine is the following.

When the machine moves with each duct 13, 13' straddling rows of vine stocks such as $C_1$, $C_3$, the end doors of the ducts arranged as lock-chambers open and close for allowing a new stock to enter or for allowing a stock on which the picking has just been completed to move out of the duct and this while however providing a relatively tight or sealed closing of the duct or passage-way at each one of its ends. Also the floors at the base or bottom of the bells allow the passing of the stumps and provide for a least air loss at the base. Of course the better the fluid-tightness of the passage-way duct the less important the air blowing power required for picking.

According to an essential characterizing feature of the invention on account of the main air feed to each bell a main air flow blown under a relatively low pressure for instance of about a few tenths of a bar is caused to enter each bell according to a rising gyratory motion.

Moreover, owing essentially to the additional air modulation entering under a higher pressure but with a smaller flow rate vibrations of a given period adjustable by the modulator are generated in the whirling mass or body of air within each bell. Under such circumstances the berries are set to vibrate according to an alternating torsional or twisting motion (due to the gyration of the main air flow) and if care is taken that the modulation frequency is adjusted so as to correspond substantially to the own or natural oscillation frequency of the berries the latter are severed from the stalk through breaking of the stem. The vine grape is then thrown into the raising gyratory air motion and centrifugated along the inner wall of the bell and its moves upwards, its rising motion being promoted by the ramp or guideway 30. The vine grapes are finally collected in the receiving duct 27 from which they are discharged into the drawn receiving bucket. The stalks and the leaves which have quite different oscillation frequencies are practically not sensitive to the rising gyratory air motion or to the pulsating modulations so that they remain or are left on the stocks and accordingly the machine delivers a clean and stripped vintage.

The bottoms of the passage-way ducts or shoots may be slightly sloping so that the vine grapes which could fall onto the floors of the bells be automatically directed towards the leading end of the ramp or guideway 30 so as to be quickly carried along upwards.

Many alternative modifications may be made to the form of embodiment shown and described. Thus in particular the machine may be adapted for picking nailed-up or trained vines. In such a case it is advantageous to provide each bell in two substantially symmetrical parts which take in the tied or trained stocks therebetween and any suitable means may be provided for this purpose.

Also to facilitate the working of the machine it may be advantageous before carrying out the picking of goblet-trained stocks to shape same by cutting or trimming them so that they may enter without difficulties the openings of the end doors of the passage-way duct in front of the openings 33 of the lower walls of the bells.

The invention therefore comprises all the technical equivalents of the means described as well as their combinations if the latter are carried out according to its gist and used within the scope of the appended claims.

What is claimed is:

1. A machine for automatically picking fruits and berries on shrubs comprising means for enclosing the shrubs within an enclosed space which is subjected to the action of an air stream likely to sever the fruits and berries, said enclosed space comprises at least one bell which encloses in substantially fluid-tight relationship the major part of the shrub; means for blowing within the enclosed space an air flow of rising gyratory displacement, means for modulating and vibrating the gyratory rising air flow in the bell, and means for receiving within a top portion of the bell the severed fruits which have risen to the top portion by the centrifugal motion of the air flow.

2. A machine according to claim 1, wherein said bell comprises inside thereof at least one helical guideway ramp extending upwards in the direction of rotation of said air displacement which is flowing therethrough.

3. A machine according to claim 1 wherein the means for modulating and vibrating the air flow comprises a further source of air flow into said bell.

4. A machine according to claim 1, comprising a series of two juxtaposed bells communicating with each other and forming a passage-way duct adapted to move along a row of shrubs, said passage-way duct comprising at its ends, doors for shutting off the inner space of said passage-way duct.

5. A machine according to claim 4, wherein said doors are provided as double doors defining lock-chambers at each end of said passage-way duct.

6. A machine according to claim 4, wherein feeler means are provided for operating the suitably timed opening and closing of said doors upon the introduction of a new shrub into said passage-way duct or the exit of a shrub the fruits of which have already been gathered, said opening and closing being controlled by suitable operating means.

7. A machine according to claim 1 wherein said bells comprise floor parts which move aside and away from each other from the center line of said bell or to move towards each other for allowing the stumps of said shrubs to pass therebetween.

8. A machine according to claim 7, wherein said floor parts comprise portions which are adapted to slide substantially horizontally while being operated by operating means controlled by feelers detecting said stumps.

9. A machine according to claim 2, wherein the bottoms of said bells are sloping towards the base of said guideway ramp on which the picked fruits are carried along.

10. A machine according to claim 4, wherein an impeller turbine is mounted between each pair of said juxtaposed bells for blowing said air flow in opposite gyrating directions at the bottom of each one of said bells of said pair substantially at the common opening through which said bells communicate with each other.

11. A machine according to claim 1, wherein the top portion of said bell are provided each one with a chimney stack-like extension closed at its center while leaving an annular space for the passage of said fruits towards said receiving means, said annular space being an extension of the top portion of said bell.

12. A machine according to claim 10, wherein said bells are carried by a tractor vehicle which also comprises motors supplying the power required for driving said turbines and for the operation of the various control members of said machine.

13. A machine according to claim 3, wherein said main air flow is fed with a large flow rate and under a low pressure whereas said secondary air flow is supplied with a comparatively low flow rate and under a comparatively large pressure.

* * * * *

UNITED STATES PATENT AND TRADEMARK OFFICE
CERTIFICATE OF CORRECTION

PATENT NO. : 3952487
DATED : April 27, 1976
INVENTOR(S) : GEORGES GUIBEAUD

It is certified that error appears in the above-identified patent and that said Letters Patent are hereby corrected as shown below:

[30] Add the following priority data:

May 6, 1974     France         7415667

Claim 13, line 3, change "secondary" to --further--

Signed and Sealed this

Twenty-seventh Day of July 1976

[SEAL]

Attest:

RUTH C. MASON
*Attesting Officer*

C. MARSHALL DANN
*Commissioner of Patents and Trademarks*